US008560504B2

(12) United States Patent
Parker et al.

(10) Patent No.: US 8,560,504 B2
(45) Date of Patent: Oct. 15, 2013

(54) WEB SERVICE PERFORMANCE INDEX

(75) Inventors: Leo F. Parker, Ocean Springs, MS (US); Vlad Umansky, Newton, MA (US); Marc R. Caminetsky, Newton, MA (US); Dmitri Tcherevik, Setauket, NY (US); Davanum M. Srinivas, Sharon, MA (US); Dennis J. Kelly, Hingham, MA (US)

(73) Assignee: CA, Inc., Islandia, NY (US)

( * ) Notice: Subject to any disclaimer, the term of this patent is extended or adjusted under 35 U.S.C. 154(b) by 1307 days.

(21) Appl. No.: 10/995,654

(22) Filed: Nov. 23, 2004

(65) Prior Publication Data

US 2005/0187950 A1    Aug. 25, 2005

Related U.S. Application Data

(60) Provisional application No. 60/525,523, filed on Nov. 25, 2003.

(51) Int. Cl.
  G06F 17/30    (2006.01)
(52) U.S. Cl.
  USPC ........................................ 707/688; 707/634
(58) Field of Classification Search
  None
  See application file for complete search history.

(56) References Cited

U.S. PATENT DOCUMENTS

| | | | |
|---|---|---|---|
| 5,717,923 A * | 2/1998 | Dedrick | 707/102 |
| 5,905,868 A * | 5/1999 | Baghai et al. | 709/224 |
| 5,930,773 A * | 7/1999 | Crooks et al. | 705/30 |
| 5,949,976 A * | 9/1999 | Chappelle | 709/224 |
| 6,088,688 A * | 7/2000 | Crooks et al. | 705/412 |
| 6,144,961 A | 11/2000 | de la Salle | |
| 6,154,729 A * | 11/2000 | Cannon et al. | 705/35 |
| 6,317,786 B1 | 11/2001 | Yamane et al. | |
| 6,377,939 B1 * | 4/2002 | Young | 705/34 |
| 6,381,635 B1 * | 4/2002 | Hoyer et al. | 709/207 |
| 6,385,609 B1 | 5/2002 | Barshefsky et al. | |
| 6,701,363 B1 * | 3/2004 | Chiu et al. | 709/224 |
| 6,760,775 B1 | 7/2004 | Anerousis et al. | |
| 6,760,903 B1 | 7/2004 | Morshed et al. | |
| 6,789,050 B1 | 9/2004 | Reeser et al. | |
| 6,792,459 B2 | 9/2004 | Elnozahy et al. | |
| 6,823,382 B2 | 11/2004 | Stone | |
| 6,947,984 B2 * | 9/2005 | Schweitzer et al. | 709/224 |
| 7,711,832 B1 * | 5/2010 | Champion et al. | 709/228 |
| 2002/0042823 A1 * | 4/2002 | DeBettencourt et al. | 709/224 |
| 2002/0099818 A1 | 7/2002 | Russell et al. | |
| 2003/0208533 A1 | 11/2003 | Farquharson et al. | |

(Continued)

OTHER PUBLICATIONS

Rice, Jim, et al., "Pilot to Assess Readiness of XML Web Services for E-Gov Initiatives", Internet, [Online], Retrieved from the Internet: <http://web.archive.org/web/20030821090330/http://web-services.gov/amberpoint62803.ppt>, AmberPoint, Inc., Aug. 21, 2003, XP-002438333, pp. 1-20.

(Continued)

*Primary Examiner* — Debbie Le
(74) *Attorney, Agent, or Firm* — Pillsbury Winthrop Shaw Pittman LLP

(57) ABSTRACT

A system for providing a web service performance index is operable to collect service metric data from each of a plurality of web services, with at least one of the web services comprising a remote web service. A web service performance index is generated based on the collected service metric data. The web service performance index is then published to a website.

40 Claims, 6 Drawing Sheets

(56) References Cited

U.S. PATENT DOCUMENTS

| | | |
|---|---|---|
| 2004/0054680 A1* | 3/2004 | Kelley et al. .............. 707/100 |
| 2004/0064548 A1 | 4/2004 | Adams et al. |
| 2004/0107196 A1* | 6/2004 | Chen et al. .................. 707/4 |
| 2004/0230674 A1 | 11/2004 | Pourheidari et al. |

OTHER PUBLICATIONS

Vambenepe, William, et al., "Web Services Management Framework—Web Services Management (WSMF-WSM)—Version 2.0", Internet, [Online], Retrieved from the Internet <http://devresource.hp.com/drc/specifications/wsmf/WSMF-WSM.pdf>, Jul. 16, 2003, XP-002438334, pp. 1-44.

McGregor, Carolyn, et al., "Business Process Monitoring Using Web Services in B2B e-Commerce", *Proceedings of the International Parallel and Distributed Processing Symposium* (IPDPS'02), IEEE, Apr. 15, 2002, XP-010591284, pp. 219-226.

Wu, K-L, et al., "SpeedTracer: A Web Usage Mining and Analysis Tool", *IBM Systems Journal*, vol. 37, No. 1, IBM Corporation, 1998, XP-000737904, pp. 89-105.

* cited by examiner

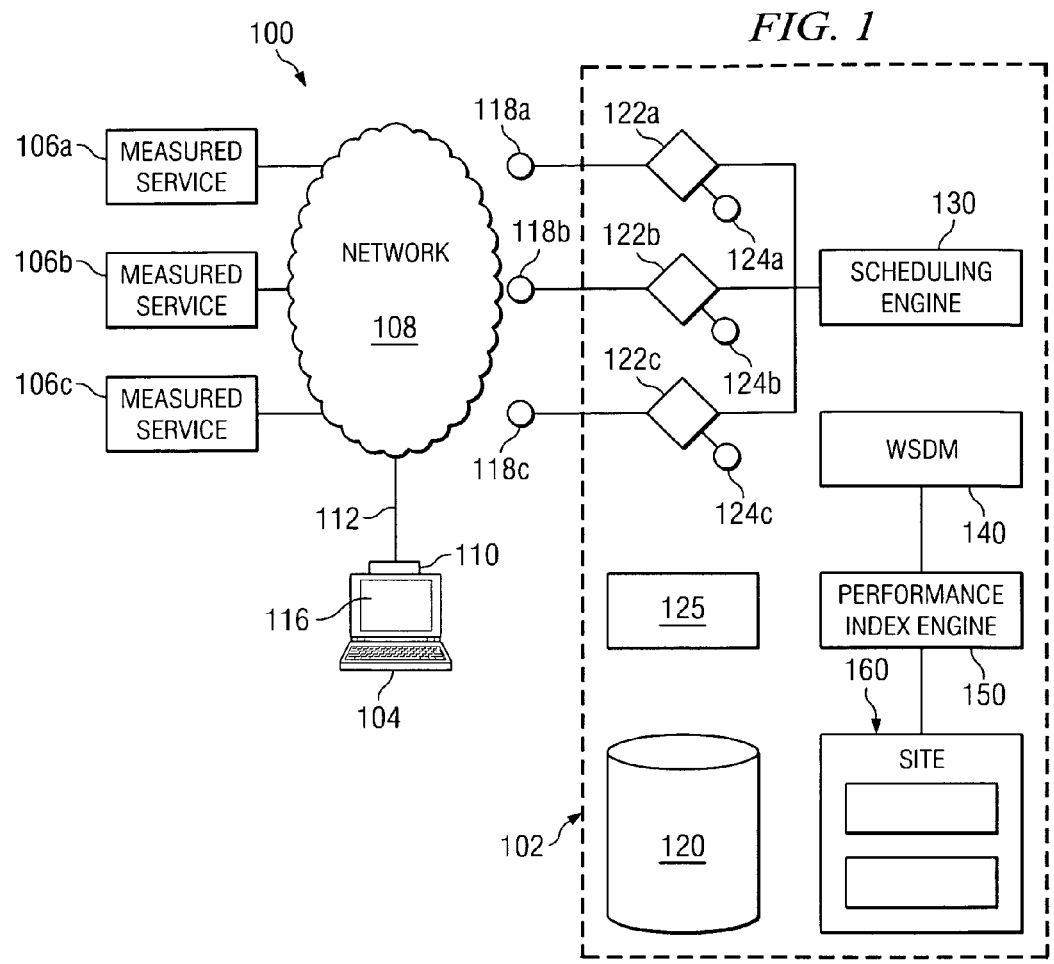
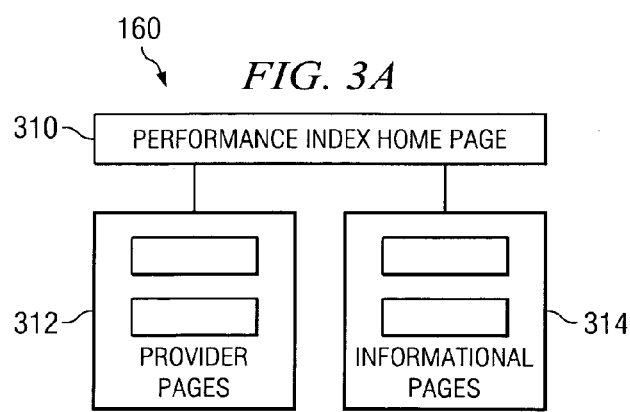

*FIG. 4A*

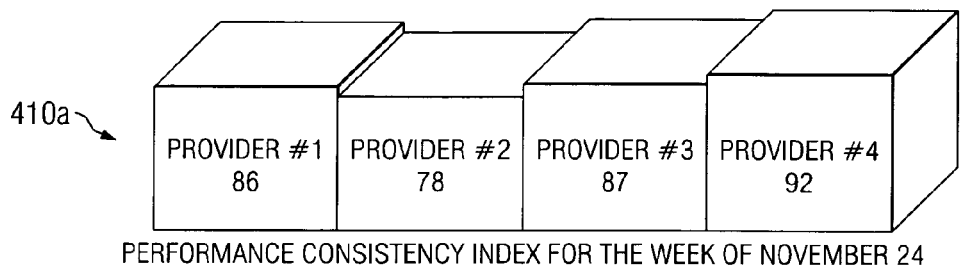

PERFORMANCE CONSISTENCY INDEX FOR THE WEEK OF NOVEMBER 24

*FIG. 4B*

| SERVICE | DESCRIPTION |
|---|---|
| ActorSearchRequest | SEARCH FOR ITEMS CONTAINING SPECIFIED ACTOR |
| ArtistSearchRequest | SEARCH FOR ITEMS BY ARTIST |
| ManufacturerSearchRequest | SEARCH FOR ITEMS OF SELECTED MANUFACTURER |
| WishlistSearchRequest | ACCESS WISHLIST ITEMS |
| ClearShoppingCartRequest | CLEAR THE SHOPPING CART |

*FIG. 4C*

| DAY OF WEEK | AVERAGE RESPONSE TIME (msec) |
|---|---|
| MONDAY - 11/15 | 36 |
| TUESDAY - 11/16 | 42 |
| WEDNESDAY - 11/17 | 24 |
| THURSDAY - 11/18 | 19 |
| FRIDAY - 11/19 | 37 |
| SATURDAY - 11/20 | 43 |
| SUNDAY - 11/21 | 29 |

ActorSearchRequest
AVERAGE RESPONSE TIME FOR THE WEEK
OF NOVEMBER 15 TO 21

*FIG. 4D*

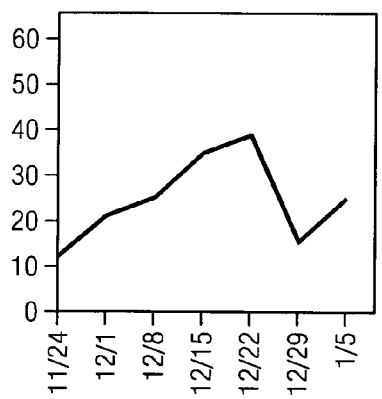

ActorSearchRequest
AVERAGE WEEKLY RESPONSE TIME

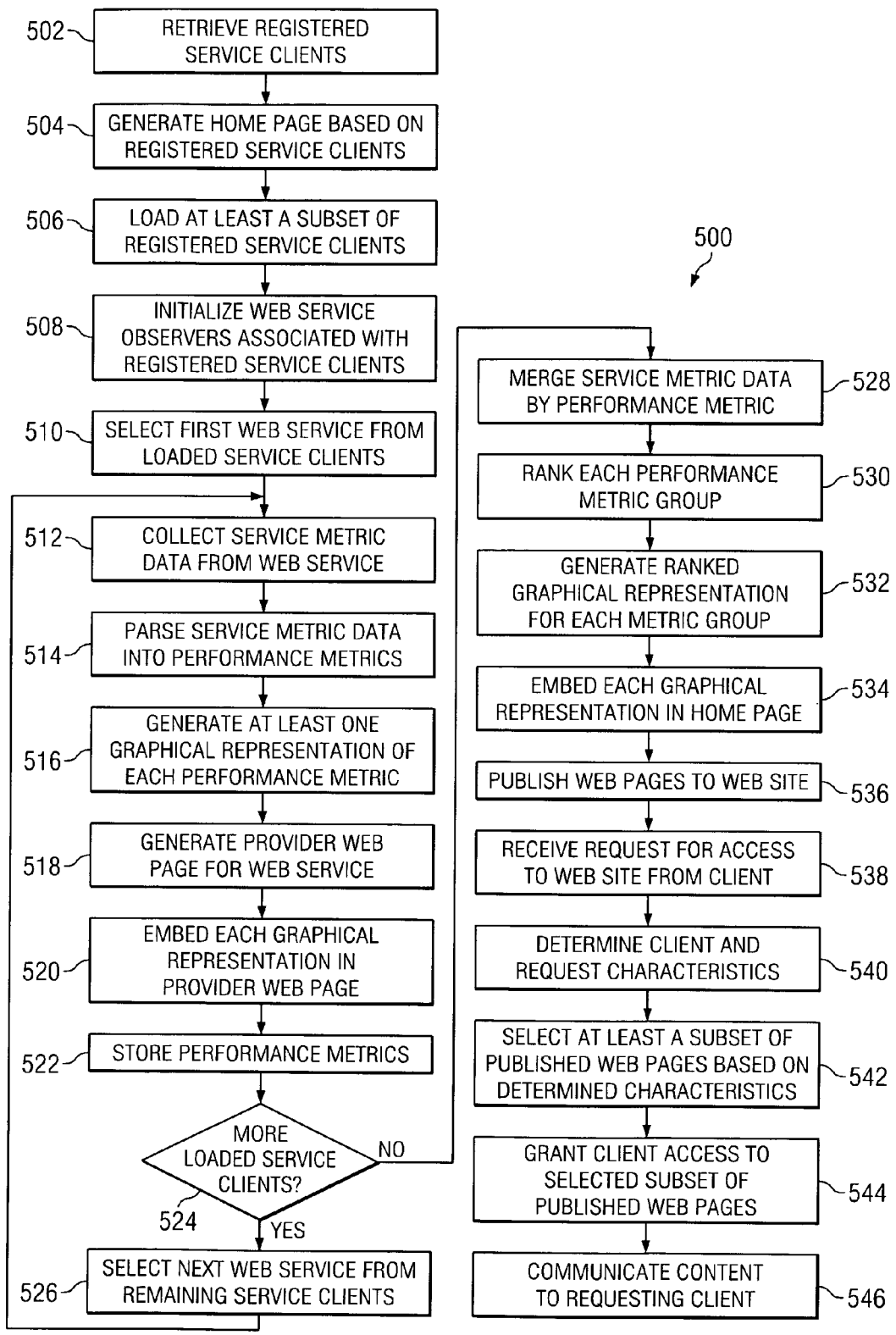

WEB SERVICE PERFORMANCE INDEX

RELATED APPLICATION

This application claims the priority under 35 U.S.C. §119 of provisional application Ser. No. 60/525,523 filed Nov. 25, 2003.

TECHNICAL FIELD

This disclosure relates generally to the field of computer networks and, more specifically, to a web service performance index.

BACKGROUND

Web services are generally self-contained, self-describing, modular software applications that can be published, located, and invoked across the Internet or other type of network. Current web services perform various computing and processing functions including simple requests and complicated business processes. Once web services are deployed onto the Internet, for example, other applications, including other web services may locate and invoke deployed web services. Typically, web services make enterprise application integration simpler and less expensive and open new opportunities by increasing user reach and extending business partnerships.

SUMMARY

This disclosure provides a system and method for providing a web service performance index. For example, the method may include collecting service metric data from each of a plurality of web services, with at least one of the web services comprising a remote web service. A web service performance index is generated based on the collected service metric data. The web service performance index is then published to a website.

DESCRIPTION OF THE DRAWINGS

FIG. 1 illustrates an example system for providing a web service performance index in accordance with one embodiment of the present disclosure;

FIGS. 3A-C illustrate an example website and associated web pages in accordance with one embodiment of the system in FIG. 1;

FIGS. 4A-D are diagrams illustrating example graphical representations of various performance indices and performance metrics in accordance with one embodiment of the website illustrated in FIGS. 3A-C; and FIG. 5 is a flowchart illustrating an example method for providing a web service performance index in accordance with one embodiment of the present disclosure.

DESCRIPTION OF EXAMPLE EMBODIMENTS

Figure 2:
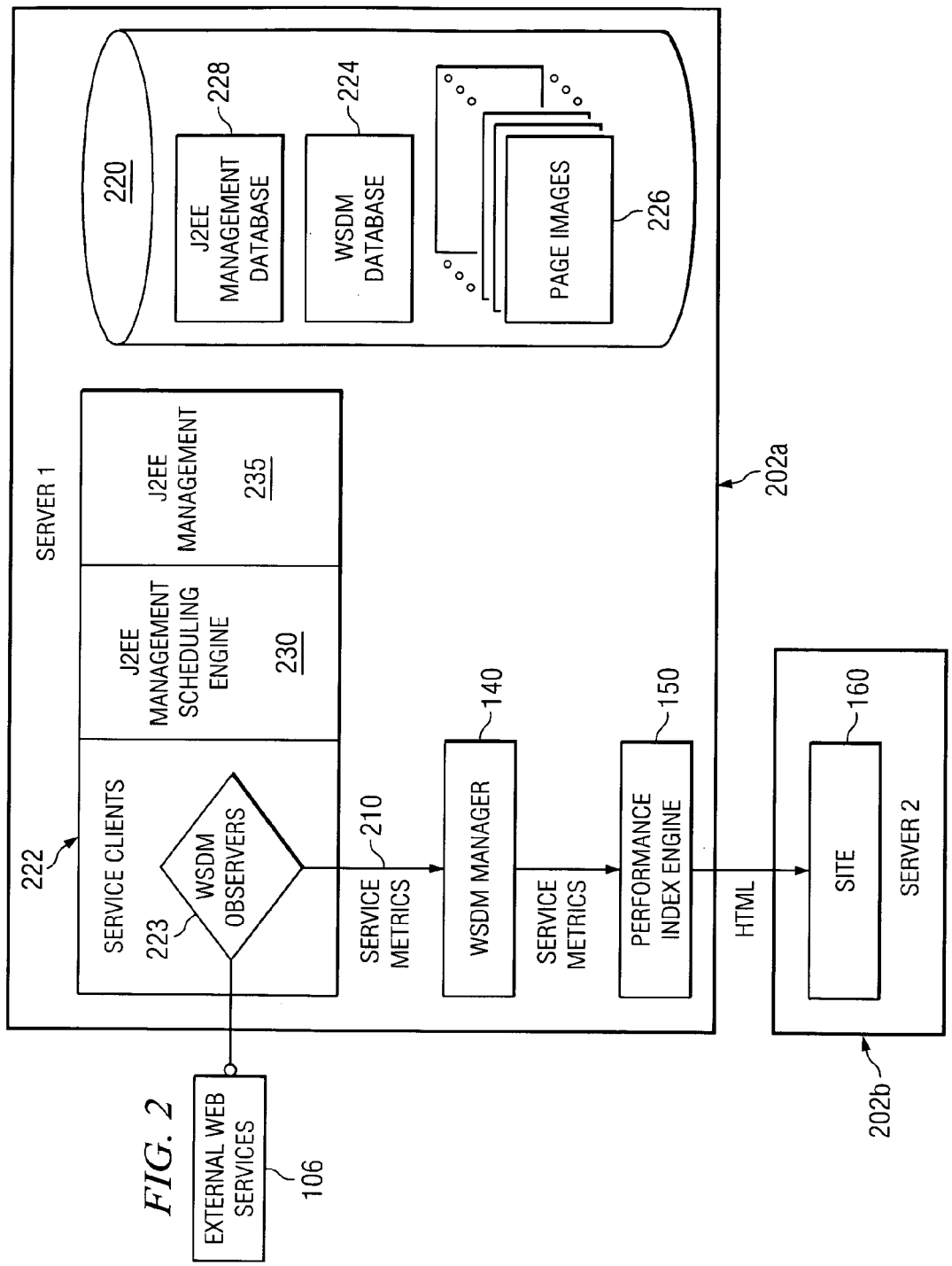
FIG. 2 is a more detailed illustration of an example server for providing a web service performance index in accordance with one embodiment of the system of FIG. 1.

FIG. 1 is a block diagram illustrating a system 100 for providing a centralized performance indicator for a plurality of remote web services 106 according to one embodiment of the present disclosure. At a high level, system 100 is a networked environment comprising at least one client 104, a server 102, and one or more web services 106, but may also be a standard computing environment or any other suitable environment. In general, system 100 comprises a local server 102 that compiles web service performance metrics, collectively termed service metric data, from the plurality of web services 106 via, for example, network 108 and provides the appropriate performance metrics and indices to client 104 in an understandable and efficient format. For example, system 100 may comprise an enterprise information technology system that utilizes web services 106 across the Internet, automatically retrieves or receives performance metrics for any number of web services 106, and dynamically provides the appropriate metrics to a system or network administrator via a workstation 102. The term "automatically," as used herein, generally means that the appropriate processing is substantially performed by at least part of system 100. It should be understood that "automatically" further contemplates any suitable user interaction with system 100 without departing from the scope of this disclosure. The term "dynamically," as used herein, generally means that certain processing is determined, at least in part, at run-time based on one or more variables.

Server 102 comprises any computer including Web Services Distributed Management (WSDM) application 140 and rendering engine 150 and communicably connected to at least one client 104 and/or one web service 106. For example, server 102 may be a general-purpose personal computer (PC), a Macintosh, a workstation, a Unix-based computer, a server computer, or any other suitable device. FIG. 1 only provides one example of computers that may be used with the disclosure. For example, although FIG. 1 illustrates one server 102 that may be used with the disclosure, system 100 can be implemented using computers other than servers, as well as a server pool. The present disclosure contemplates computers other than general purpose computers as well as computers without conventional operating systems. As used in this document, the term "computer" is intended to encompass a personal computer, workstation, network computer, or any other suitable processing device. Computer server 102 may be adapted to execute any operating system including UNIX, Windows, or any other suitable operating system so long as server 102 remains communicably connected to client 104 and web services 106. Moreover, server 102 may include, alternatively or in combination, a web server or web server functionality. In short, server 102 may comprise any computer with software and/or hardware in any combination suitable to receive or retrieve web service performance metrics from web services 106, generate web pages and performance indices based on the performance metrics, and communicate the web pages to client 104 via network 108.

Web service 106 generally comprises a self-contained, self-describing, modular software application that can be published, located, referenced and/or invoked across network 108. Web service 106 performs various computing and processing functions including simple requests and complicated business processes. Once web service 106 is deployed onto or through network 108, other applications, including other web services 106, may locate and invoke deployed web service 106. In one embodiment, at least some of the web services 106 are software applications normally identified by a URI, as defined by IETF RFC 2396, operable to be defined, described and located by extensible Markup Language (XML) artifacts. In this embodiment, web service 106 is further operable to directly interact with other software applications using XML-based messages. Each web service 106 is associated with a web service provider and may include a plurality of web service methods. The web service provider may be a third-party, a remote but related business entity, or any other appropriate supplier or host of one or more web services 106. Often, server 102 will determine a performance index for each web service provider using some or all of the associated web services 106.

Network 108 facilitates wireless or wireline communication between computer server 102 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Server 102 further includes service client interfaces 118, service clients 122, WSDM management interfaces 124, memory 120, and processor 125. In one embodiment, a web service provider may register an associated web service 106 with server 102. Once registered, server 102 may automatically generate an associated service client 122 or receive a previously generated or manually entered service client 122 via network 108. Memory 120 may include any memory or database module and may take the form of volatile or non-volatile memory including, without limitation, magnetic media, optical media, random access memory (RAM), read-only memory (ROM), removable media, or any other suitable local or remote memory component. Server 102 also includes processor 125. Processor 125 executes instructions and manipulates data to perform the operations of client 104 such as, for example, a central processing unit (CPU), an application specific integrated circuit (ASIC) or a field-programmable gate array (FPGA). Although FIG. 1 illustrates a single processor 125 in server 102, multiple processors 125 may be used according to particular needs, and reference to processor 125 is meant to include multiple processors 125 where applicable. In certain embodiments, processor 125 executes one or more processes associated with scheduling engine 130, WSDM engine 140, and/or performance index engine 150.

Scheduling engine 130 could include any hardware, software, firmware, or combination thereof operable to schedule the collection of service metric data from one or more web services 106. Scheduling engine 130 may dynamically schedule the collection of service metric data based on time, web service 106, web service provider, or any other appropriate variable. It will be understood that while scheduling engine 130 is illustrated as a single multi-tasked module, the features and functionality performed by these engine may be performed by multiple modules such as, for example, a scheduler and a Java interface. WSDM engine 140 could include any hardware, software, firmware, or combination thereof operable to receive and process service metric data and present it to performance index engine 150 for further processing and rendering. Further, WSDM engine 140 may store the performance metrics in memory 120. It will be understood that while WSDM engine 140 is illustrated as a single multi-tasked module, the features and functionality performed by these engine may be performed by multiple modules.

Performance index engine 150 could include any hardware, software, firmware, or combination thereof operable to process collected service metric data, determine one or more performance indices, and present it to client 104 through GUI 116. Further, performance index engine 150 may render graphical representations of the performance indices and generate website 160 based on the collected service metric data. It will be understood that while performance index engine 150 is illustrated as a single multi-tasked module, the features and functionality performed by these engine may be performed by multiple modules such as, for example, an index calculation module and a rendering engine. Moreover, scheduling engine 130, WSDM engine 140, and/or performance index engine 150 may each comprise a child or sub-module of another software module without departing from the scope of this disclosure. In short, scheduling engine 130, WSDM engine 140, and/or performance index engine 150 comprise one or more software modules, individually or collectively, operable to create and present at least one web service performance index for multiple web services 106 via GUI 116.

Each client 104 is any computing device operable to present the user with web service performance data via a graphical user interface 116 (GUI). At a high level, illustrated client 104 includes at least GUI 116 and comprises an electronic computing device operable to receive, transmit, process and store any appropriate data associated with system 100. It will be understood that there may be any number of clients 104 communicably coupled to server 102. Further, "client 104" and "user of client 104" may be used interchangeably without departing from the scope of this disclosure. As used in this document, client 104 is intended to encompass a personal computer, workstation, network computer, kiosk, wireless data port, personal data assistant (PDA), server, one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 102, including digital data or visual information, via GUI 116. Both the input device and output device may include fixed or removable storage media such as a magnetic computer disk, CD-ROM, or other suitable media to both receive input from and provide output to users of clients 102 through GUI 116.

GUI 116 comprises a graphical user interface operable to allow the user of client 104 to interface with system 100 to view performance indices based on performance metrics, each from one web service 106. Generally, GUI 116 provides the user of client 104 with an efficient and user-friendly presentation of data provided by system 100, namely website 160. GUI 116 may comprise a plurality of frames or views having interactive fields, pull-down lists, and buttons operated by the user. In one embodiment, GUI 116 presents one or more web pages from performance index website 160 and receives commands from the user of client 104 via one of the input devices. As illustrated in more detail in FIGS. 3A-C, website 160 comprises a plurality of web pages operable to present client 104 with one or more performance indices. Often, website 160 is stored on server 102; but it will be understood that website 160 may be local or remote as well as distributed or integrated, without departing from the scope of the disclosure. Returning to GUI 116, it should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in system 100 and efficiently presents the information to the user. Server 102 can accept data from client 104 via the web browser (e.g., Microsoft Internet Explorer or Netscape Navigator) and return the appropriate HTML or XML responses using network 108.

Illustrated client 104 includes interface 110 for communicating with other computer systems, such as server 102, over network 108 in a client-server or other distributed environment. In certain embodiments, client 104 receives the web server performance data from network 108, through interface 110, for display in GUI 116 or storage in memory or cache. Generally, interface 110 comprises logic encoded in software and/or hardware in a suitable combination and operable to communicate with network 108 via link 112. More specifically, interface 110 may comprise software supporting one or more communications protocols associated with communications network 108 or hardware operable to communicate physical signals.

In one aspect of operation, scheduling engine 130 initializes and loads one or more service clients 122 operable to retrieve, receive, or otherwise collect service metric data from web services 106 via service client interfaces 118. Based on this collected service metric data, performance index engine 150 calculates at least one performance index for each web service provider. For example, performance index engine 150 may calculate a consistency performance index for each provider or any other appropriate performance index based on service response time, transaction volume, fault frequency, and/or other performance metrics. The example consistency performance index is generally defined as one hundred minus the standard deviation of the average service performance over a determined timeframe, such as the past seven days. Accordingly, in this example, each provider's consistency index is based on the average weekly service response time for each web service 106 associated with the provider. The average weekly response time for a provider is calculated using the average response time for all web services 106 associated with the provider that are selected for being measured. For example purposes, a first provider includes measured web services 106a, 106b, and 106c, with each associated average weekly response times as follows:

|  | Week 1 | Week 2 | Week 3 |
| --- | --- | --- | --- |
| First measured service 106a | 14 | 12 | 15 |
| Second measured service 106b | 20 | 30 | 32 |
| Third measured service 106c | 16 | 16 | 18 |

Based on this example metric data, performance index engine 150 calculates the average weekly response times for the provider:

Week 1=(14+20+16)/3=16.7

Week 2=(12+30+16)/3=19.3

Week 3=(15+32+18)/3=21.7

Next, performance index engine 150 determines the standard deviation of the average weekly response times. The standard deviation for this three week period is 3.559, calculated as follows:

(19+17+22)/3=19.33=average response $(19.33-19)^{}2=0.1089$ $(19.33-17)^{}2=5.4289$ $(19.33-22)^{**}2=7.1289$ (0.1089+5.4289+7.1289)=12.6667

The square root of 12.6667=3.559

The above example calculations result in a standard deviation of 3.559. Accordingly, the example performance index for the first provider over the three week period is (100−3.559) or 96.441. It will be understood that the above example calculations for the performance index are for illustration purposes only and any appropriate mathematical or non-mathematical technique, algorithm, or logic, resulting in any numeric, non-numeric, graphical, or other suitable performance index may be used. Moreover, performance index engine 150 may use any performance metric of the collected service metric data to generate one or more of the performance indices. Once the appropriate performance indices are calculated or otherwise determined, performance index engine 150 generates at least one graphical representation of each performance index. These graphical representations are then embedded in one or more appropriate web pages and published to website 160 for subsequent access by client 104. Each graphical representation may be a chart, a table, a graph, a text log, or any other appropriate graphical element operable to be embedded in any document, file, or web page at any suitable time (such as on request). Example graphical representations and elements are illustrated in FIGS. 4A-D. According to certain embodiments, server 102 may also automatically email the web pages, the graphical representations, or solely one or more performance indices to client 104. It will be understood that performance index engine 150 may collect real-time service metric data and aggregate it, over a period of time, prior to determining the performance index without departing from the scope of the disclosure. Moreover, server 102 may be configured to automatically notify an administrator if the performance indices meet certain criteria (such as indicating a performance issue).

FIG. 2 is a more detailed illustration of example server 102 for providing at least one web service performance index to client 104 in accordance with one embodiment of system 100. In this embodiment, server 102 includes two different machines: processing server 202a and generic web server 202b. In addition to certain example components in server 102, processing server 202a includes a memory 220, Java management scheduling engine 230, and Java management 235.

As with memory 120, memory 220 may include any memory, hard drive, or database module and may take the form of volatile or non-volatile memory including, without limitation, magnetic media, optical media, random access memory (RAM), read-only memory (ROM), removable media, or any other suitable local or remote memory component. Illustrated memory 220 stores, or includes references to, WSDM DB 224, web page images 226, and Java management DB 228. WSDM DB 224 and Java management DB 228 may each comprise a relational database described in terms of SQL statements or scripts or an object-oriented database. Relational databases often use sets of schemas to describe the tables, columns, and relationships in the tables using basic principles known in the field of database design. In another embodiment, WSDM DB 224, web page images 226, and Java management DB 228 may comprise XML documents, HTML files, JavaScripts, flat files, Btrieve files, or comma-separated-value (CSV) files.

In the illustrated embodiment, service metric data 210 is obtained from web services 106 via regularly scheduled synthetic transactions according to Java management scheduling engine 230. Synthetic transaction creation and scheduling are driven by service clients 222 typically created using Java management 235 and Java management DB 228. Each service client 222 is instrumented with native observers 223, with each observer operable to watch a particular performance metric. Service metric data, gathered by observers 223 associated with service client 222, are aggregated by the WSDM 140 and placed in WSDM DB 224. For each web service 106, performance index engine 150 extracts individual performance metrics for the average weekly and daily service response times and generates graphical representations of the calculated performance indices. According to certain embodiments, these values are pre-calculated and in WSDM DB 224.

Figure 3B:
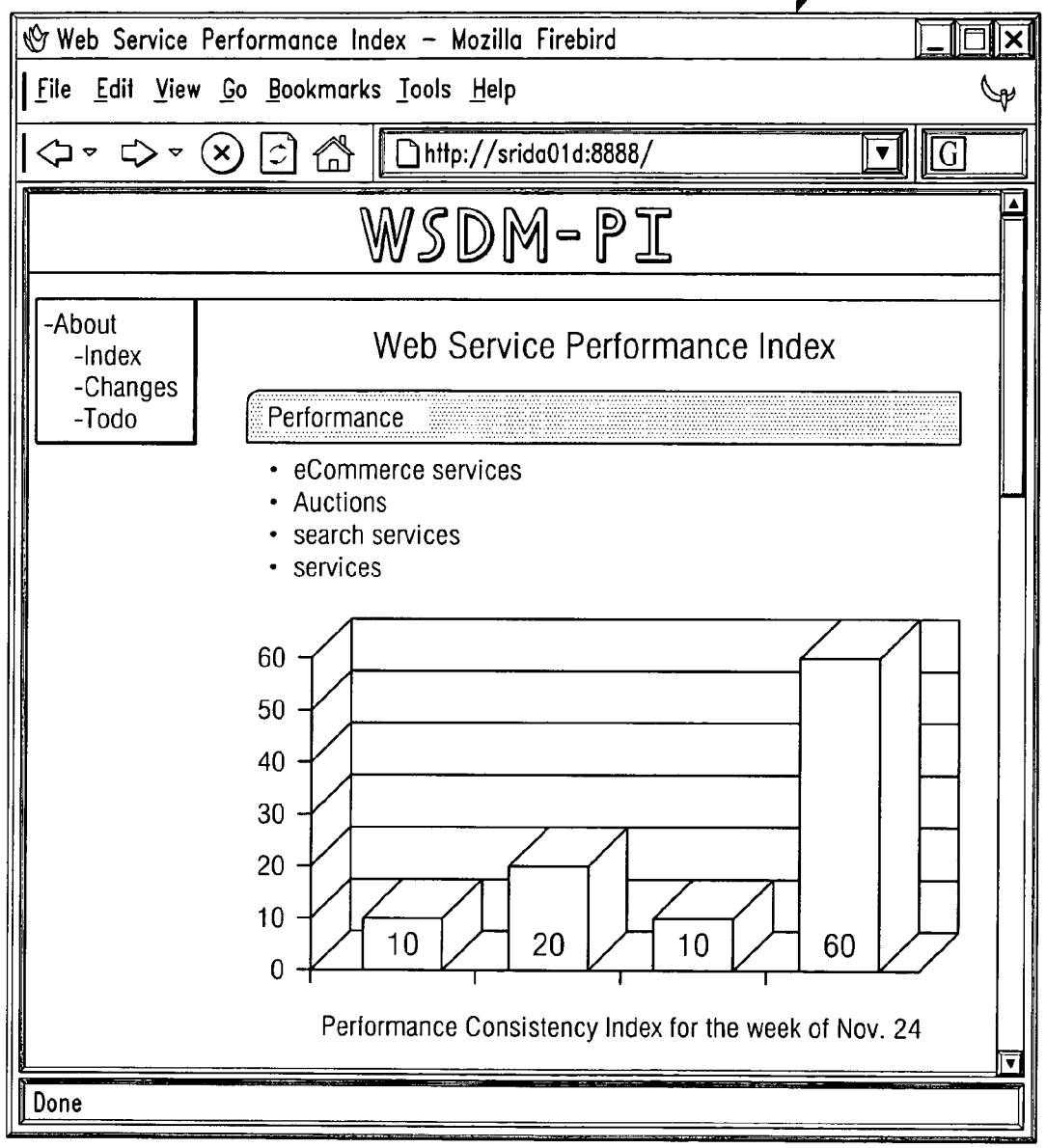
Figure 3C:
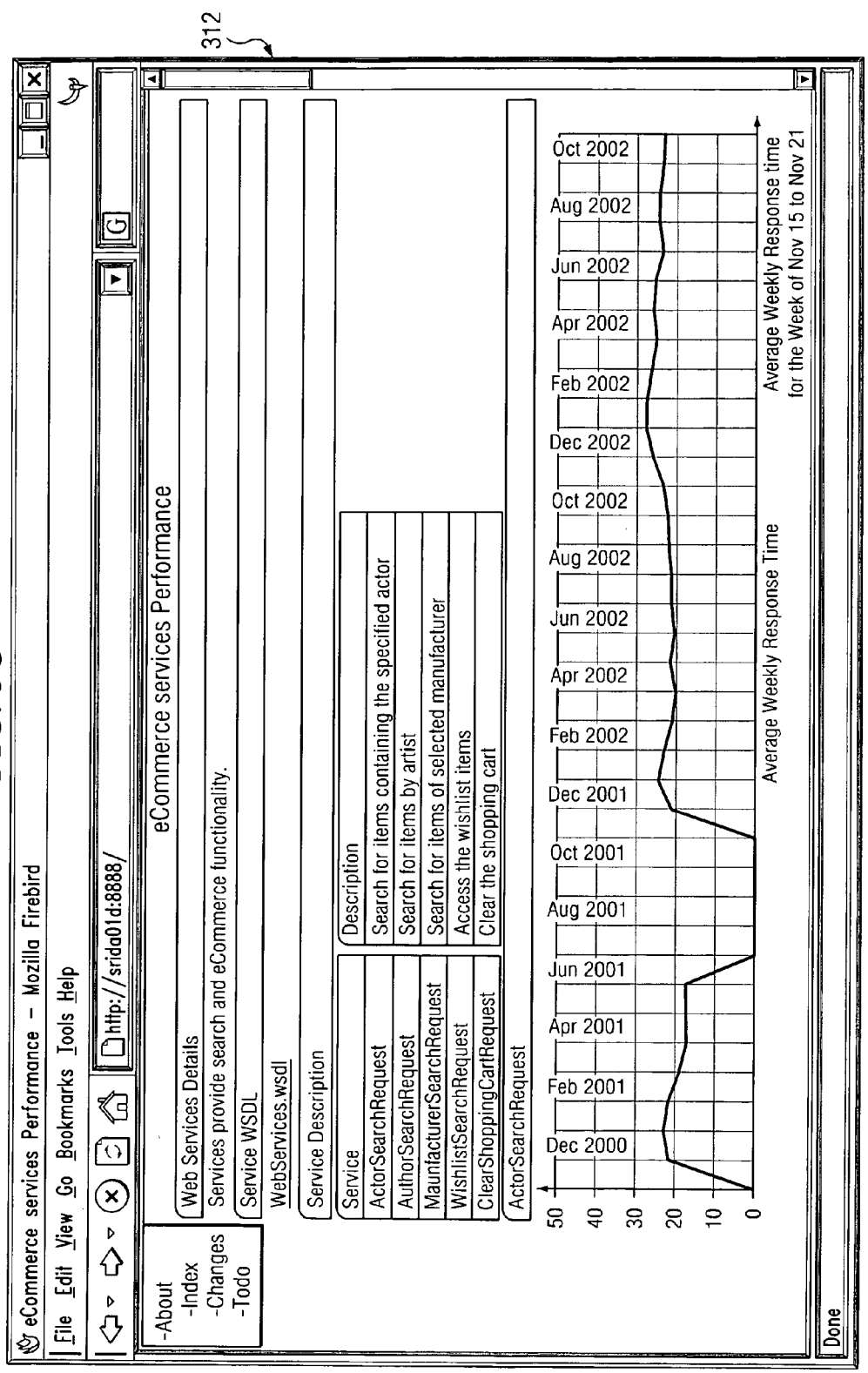

FIGS. 3A-C illustrate example website and associated web pages in accordance with one embodiment of system 100. FIG. 3A illustrates an example layout of website 160. Illustrated website 160 includes a home page 310 and in one embodiment at least one child page such as, for example, provider pages 312 and informational pages 314. Generally, home page 310 provides an entry to website 160 for client 104. Home page 310, described in more detail in FIG. 3B, presents basic information in regard to website 160, as well as one or more comparative performance indices. Each provider page 312 displays descriptive information about the relevant web service provider and the one or more performance indices based on the service metric data collected about the provider. Informational pages 314 comprise any other suitable web pages for presenting informative data to client 104 such as, for example, search pages, contact pages, help pages, website index, links to other websites, legal information, site operation, performance index calculation, web service general description, and others.

FIG. 3B illustrates an example home page 310. According to one embodiment, the home page includes a banner, an information block, a table of providers, one or more comparative graphical representations of multiple performance indices, and a "more information" panel. The banner generally identifies or promotes the website. The information block providing a brief introduction to the site's function and links to pages containing more detailed descriptions of the website and associated web services management. The table of providers often contains links to provider pages 312 displaying service performance charts and tables. Each link is typically a provider or collection name, but may be any other operative or descriptive word or phrase. The "more information" panel with a combo box containing links to pages provides access to site and web service management information sources.

FIG. 3C illustrates an example provider page 312. Generally provider page 312 describes the collection of web services associated with the provider and displays some performance measurements for each web service 106 using one or more graphical representations and performance indices. According to the illustrated embodiment, provider page 312 includes an information panel, a link to the web services description language (WSDL), a service description table, and one or more service performance charts and tables or other graphical representations for performance indices. The information panel includes the web service provider name and a brief description of the functions performed by some or all web services 106 associated with the provider. The service description table provides a brief introduction to the various web services 106 associated with the web service provider. It will be understood that illustrated web pages 310 and 312 are for example purposes only. Accordingly, website 160 may include home page 310 and provider pages 312 in any format or descriptive language and each page may present any appropriate data in any layout without departing from the scope of the disclosure.

FIGS. 4A-D are diagrams illustrating example graphical representations 410 of various performance indices and performance metrics in accordance with one embodiment of the website. Generally, each graphical representation is embedded in one of the web pages, 310 or 312, for publication to the website. FIG. 4A is an example performance index bar chart comparing the current consistency performance indexes of all providers. The bar chart contains one bar for each provider. The illustrated Y-axis is the most recent consistency performance index for each provider, calculated according to any appropriate technique. FIG. 4B is an example service description table comprising a list of the web service methods offered by the provider that are currently being monitored by server 102. This list may display some or all of web services 106 offered by the web service provider without departing from the scope of the disclosure. The service description table may be a multi-dimensional data structure that includes at least one web service record. Each record includes multiple columns such as, for example, service method name ("GetMap") and brief service description ("returns a map image, a map view, and hot area definitions based on map options"). The service method name often will include an on-page link to the service performance charts associated with the service. It will be understood that each record may include none, some, or all of the example columns.

FIGS. 4C-D illustrate example a service performance chart and tables presenting recent service performance. According to one embodiment of provider page 312, there will be one chart and one table for each service within the provider's collection. FIG. 4C, in particular, illustrates one example of the table presenting average daily performance for web service 106 for the past week. Accordingly, this example table includes ate least two columns: one displaying the date or day of week and the second presenting the average daily service response times. FIG. 4D illustrates one example of the line chart presenting the average weekly performance of web service 106 for the past one to ten weeks.

FIG. 5 is a flowchart illustrating an example method 500 for providing a web service performance index in accordance with one embodiment of the present disclosure. Generally, method 500 describes server 102 retrieving service metric data from a plurality of web services 106, processing the metric data to determine individual and comparative performance indices, and presenting the indices to a client 104 over network 108 through website 160. Method 500 is described in respect to system 100 and, in particular, to server 102. However, any other suitable system or computing device may use appropriate embodiments of method 500 to present at least one web service performance index to client 104 without departing from the scope of this disclosure.

Method 500 begins at step 502 where scheduling engine 130 retrieves registered service clients 122. At step 504, performance index engine 150 generates homepage 310 based on the retrieved service clients 122. It will be understood that any generation of any web page may comprise generating a web page based on the appropriate HTML file, updating the content of a previously generated web page, or any other appropriate painting or graphical process. Scheduling engine 130 loads at least a subset of the registered service clients at step 506. Next, each web service observer associated with the loaded service client 122 is initialized at step 508. Once the appropriate software modules are loaded and initialized, service metric data is collected from the plurality of web services associated with service clients 122 in steps 510 through 526.

Scheduling engine 130 selects the first web service 106a based on the loaded service client 122a at step 510. Next, service client 122a collects, retrieves, or receives service metric data from web service 106a via service client interface 118a at step 512. It will be understood that this collection may occur at any appropriate time such as, for example, in response to a request from an administrator, automatically at a time determined by scheduling engine 130, or dynamically based on any suitable run-time parameter. Once collected, WSDM engine 140 receives the collected service data and parses it into individual performance metrics at step 514, as well as perform other suitable processing (such as data cleansing/sorting and such). These parsed performance metrics are communicated to performance index engine 150. At step 516, performance index engine 150 then generates at least one graphical representation of each performance metric. As described above, each graphical representation may be a chart, a table, a graph, a text log, or any other appropriate graphical element operable to be embedded in any document, file, or web page. Next, at step 518, performance index engine 150 generates a service web page 312 for the appropriate web service 106a. Performance index engine 150 then embeds each generated graphical representation in provider page 312 at step 520. The performance metrics are then stored in memory 120 at step 522 for subsequent access or query. Next, at decisional step 524, scheduling engine 130 determines if there are more loaded service clients 122, such as service client 122b. If there are more loaded service clients 122, then scheduling engine 130 selects the next web service, such as web service 106b, at step 526 and processing returns to step 512. Once an appropriate amount of service metric data has been collected by server 102, one or more web service performance indices are generated in steps 528 through 536.

After any appropriate amount of service metric data has been collected by server 102, then performance index engine 150 processes the collected service metric data to provide an overall or comparative picture of how various web services 106 are performing. For example, performance index engine 150 merges the collected service metric data by performance metric at step 528. This merging may include parsing and storing the collected service metric data into separate tables for each performance metric. Next, at step 530, performance index engine 150 ranks, sorts, or otherwise compares each performance metric within the merged performance metric group. At step 532, performance index engine 150 generates a ranked graphical representation for each metric group. Performance index engine 150 then embeds each ranked or comparative graphical representation in the performance index home page 310 at step 534. At step 536, performance index engine 150 then publishes generated web pages 310 and 312 to the website for appropriate access via network 108 by client 104.

Server 102 receives a request for access to the website from client 104 at step 538. Server 102 analyzes the request and determines various characteristics of client 104 and the request such as, for example, client authority, request parameters, client pay tier, or any other appropriate characteristic at step 540. Based on the determined characteristics, server 102 selects at least a subset of the published web pages 310 and 312 at step 542. If client 104 has appropriate authority, then server 102 grants client 104 access to the selected subset of published web pages at step 544. Next, at step 546, server 102 communicates any appropriate content of the selected subset of published web pages to requesting client 104.

The preceding flowchart focuses on the operation of example system 100 described in FIGS. 1, 2, and 3 as these example diagrams illustrate various functional elements that implement some or all of the preceding techniques for creating and presenting at least one web service performance index via GUI 116. However, as noted above, system 100 contemplates using any suitable combination and arrangement of functional elements for providing these operations, and these techniques can be combined with other techniques as appropriate. Further, various changes may be made to the preceding flowcharts without departing from the scope of this disclosure. In other words, many of the steps in these flowcharts may take place simultaneously and/or in different orders than as shown. Moreover, system 100 may implement methods with additional steps, fewer steps, and/or different steps, so long as the methods remain appropriate. For example, the initialization steps in method 500 may occur only upon power-up of server 102, collection and processing of the service metric data from multiple web services 106 may occur in parallel as opposed to serially, the collected service metric data may be aggregated over a period of time before being published to the website, or any other appropriate customization or implementation within the scope of this disclosure.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for providing one or more web service performance indices for a plurality of web services, the method comprising:
    associating a plurality of web services with a server system, wherein each of the plurality of associated web services comprises at least one self-contained application, remote from the server system, that provides one or more services to one or more additional applications over a network;
    generating, at the server system, a service client for each of at least one of the plurality of associated web services, wherein each service client is configured to collect service metric data from a single corresponding web service, wherein each service client includes one or more observer modules, and wherein each observer module is configured to collect service metric data from a single corresponding performance metric of a web service;
    for at least one service client, scheduling, at the server system, one or more synthetic transactions for collection of service metric data from the corresponding at least one web service;
    loading, at the server system, at least one service client;
    initializing, at the server system, each observer module of the at least one loaded service client;
    for the at least one loaded service client, executing the one or more scheduled synthetic transactions to collect, by each initialized observer module at the server system, service metric data from the corresponding at least one web service;
    generating, by the server system, using the collected service metric data, a performance index for each performance metric for which service metric data was collected, wherein each performance index includes at least one indicator, other than the collected service metric data, that reflects a performance of a web service; and
    publishing, by the server system, the generated at least one performance index.

2. The method of claim 1, wherein service metric data relating to a plurality of performance metrics is merged into one or more performance metric groups for comparison and ranking prior to the publishing.

3. The method of claim 1, wherein the performance metric comprises one of:

service response time;
transaction volume; or
fault frequency.

4. The method of claim 1, further comprising:
generating at least one graphical representation for the generated at least one performance index.

5. The method of claim 4, further comprising automatically e-mailing the at least one generated graphical representation to a client.

6. The method of claim 4, wherein the graphical representation is selected from the group consisting of at least one of a chart, a table, a graph, or a log.

7. The method of claim 1, wherein collecting service metric data comprises collecting real-time performance metrics.

8. The method of claim 1, wherein the performance index includes a consistency performance index, wherein the consistency performance index is calculated using one of the following measurements: service response time, service volume, or fault frequency, and wherein the consistency performance index is calculated using one minus the standard deviation of the average measurement over a predetermined period of time.

9. The method of claim 1, wherein publishing the generated at least one performance index further comprises:
generating a plurality of web pages for publishing to a website, the plurality of web pages including a home page and at least a first provider page associated with a first web service provider and a second provider page associated with a second web service provider; and
generating, for each of the first and the second web service provider, one or more graphical representations for at least one individual performance metric, wherein the generated one or more graphical representations represent measurements associated with the at least one individual performance metric over a pre-determined time period, and wherein the generated one or more graphical representations are included in one of the first provider page or the second provider page based on the associations of the individual performance metrics with the web services of either the first web service provider or the second service provider.

10. The method of claim 1, wherein each web service comprises at least one web service method.

11. The method of claim 9, wherein the home page comprises a link to each of the first and second provider pages.

12. The method of claim 9, further comprising:
receiving a request from a client to access the website; and
communicating at least a portion of the generated web pages to the client based on at least one client characteristic and at least partially in response to the request.

13. A computer program product comprising tangible computer-readable storage media having thereon computer-executable instructions for causing a computer to provide one or more web service performance indices for a plurality of web services, the instructions operable to configure one or more processors to:
associate a plurality of web services with a server system, wherein each of the plurality of associated web services comprises at least one self-contained application, remote from the server system, that provides one or more services to one or more additional applications over a network;
generate, at the server system, a service client for each of at least one of the plurality of associated web services, wherein each service client is configured to collect service metric data from a single corresponding web service, wherein each service client includes one or more observer modules, and wherein each observer module is configured to collect service metric data from a single corresponding performance metric of a web service;
for at least one service client, schedule, at the server system, one or more synthetic transactions for collection of service metric data from the corresponding at least one web service;
load, at the server system, at least one service client;
initializing, at the server system, each observer module of the at least one loaded service client;
for the at least one loaded service client, execute the one or more scheduled synthetic transactions to collect, by each initialized observer module at the server system, service metric data from the corresponding at least one web service;
generate, by parsing the collected service metric data, a performance index for each performance metric for which service metric data was collected, wherein each performance index includes at least one indicator, other than the collected service metric data, that reflects a performance of a web service; and
publish the generated at least one performance index.

14. The computer program product of claim 13, wherein service metric data relating to a plurality of performance metric is merged into one or more performance metric groups for comparison and ranking prior to publishing.

15. The computer program product of claim 13, wherein the performance metric comprises one of:
service response time;
transaction volume; or
fault frequency.

16. The computer program product of claim 13, wherein the instructions are further operable to configure one or more processors to generate at least one graphical representation for the generated at least one performance index.

17. The computer program product of claim 16, further configured to automatically e-mail the at least one generated graphical representation to a client.

18. The computer program product of claim 16, wherein the graphical representation is selected from the group consisting of at least one of a chart, a table, a graph, or a log.

19. The computer program product of claim 13, wherein the computer program product configured to collect service metric data comprises a computer program product configured to collect real-time performance metrics.

20. The computer program product of claim 13, wherein the performance index includes a consistency performance index, wherein the consistency performance index is calculated using one of the following measurements: service response time, service volume, or fault frequency, and wherein the consistency performance index is calculated using one minus the standard deviation of the average measurement over a predetermined period of time.

21. The computer program product of claim 13, wherein publication of the generated at least one performance index further includes:
generation of a plurality of web pages for publishing to a website, the plurality of web pages including a home page and at least a first provider page associated with a first web service provider and a second provider page associated with a second web service provider; and
generation of, for each of the first and second web service provider, one or more graphical representations for at least one individual performance metric, wherein the generated one or more graphical representations represent measurements associated with the at least one individual performance metric over a pre-determined time period, and wherein the generated one or more graphical representations are included in one of the first provider page or the second provider page based on the associations of individual performance metrics with the web services of either the first web service provider or the second service provider.

22. The computer program product of claim 13, wherein each web service comprises at least one web service method.

23. The computer program product of claim 21, wherein the home page comprises a link to each of the first and second provider pages.

24. The computer program product of claim 21, wherein the instructions are further operable to configure one or more processors to:
receive a request from a client to access the website; and
communicate at least a: portion of the generated web pages to the client based on at least one client characteristic and at least partially in response to the request.

25. A server system for providing at least one web service performance index for a plurality of web service, the server system comprising:
one or more processors configured to:
associate a plurality of web services with the server system, wherein each of the plurality of associated web services comprises at least one self-contained application, remote from the server system, that provides one or more services to one or more additional applications over a network;
generate, at the server system, a service client for each of at least one of the plurality of associated web services, wherein each service client is configured to collect service metric data from a single corresponding web service, wherein each service client includes one or more observer modules, and wherein each observer module is configured to collect service metric data from a single corresponding performance metric of a web service;
for at least one service client, schedule, at the server system, one or more synthetic transactions for collection of service metric data from the corresponding at least one web service;
load, at the server system, at least one service client;
initialize, at the server system, each observer module of the at least one loaded service client;
for the at least one loaded service client, execute the one or more scheduled synthetic transactions to collect, by each initialized observer module at the server system, service metric data from the corresponding at least one web service;
generate by the server system using the collected service metric data, a performance index for each performance metric for which service metric data was gathered, wherein each performance index includes at least one indicator, other than the collected service metric data, that reflects a performance of a web service; and
publish the generated at least one performance index.

26. The server system of claim 25, wherein service metric data relating to a plurality of performance metrics is merged into one or more performance metric groups for comparison and ranking prior to publishing.

27. The server system of claim 25, wherein the performance metric comprises one of:
service response time;
transaction volume; or
fault frequency.

28. The server system of claim 25, wherein the one or more processors are further configured to generate at least one graphical representation of the generated at least one performance index.

29. The server system of claim 28, the one or more processors further configured to automatically e-mail the at least one generated graphical representation to a client.

30. The server system of claim 28, wherein the graphical representation is selected from the group consisting of at least one of a chart, a table, a graph, or a log.

31. The server system of claim 25, wherein the one or more processors configured to collect service metric data comprises processors configured to collect real-time performance metrics.

32. The server system of claim 25, wherein the performance index includes a consistency performance index, wherein the consistency performance index is calculated using one of the following measurements: service response time, service volume, or fault frequency, and wherein the consistency performance index is calculated using one minus the standard deviation of the average measurement over a predetermined period of time.

33. The server system of claim 25, wherein publishing the generated at least one performance index further comprises:
generation of a plurality of web pages for publishing to a website, the plurality of web pages including a home page and at least a first provider page associated with a first web service provider and a second provider page associated with a second web service provider; and;
generate, for each of the first and second web service provider, one or more graphical representations for at least one individual performance metric, wherein the generated one or more graphical representations represent measurements associated with the at least one individual performance metric over a pre-determined time period, and wherein the generated one or more graphical representations are included in one of the first provider page or the second provider page based on the associations of individual performance metrics with the web services of either the first web service provider or the second service provider.

34. The server system of claim 25, wherein each web service comprises at least one web service method.

35. The server system of claim 33, wherein the home page comprises a link to each of the first and second provider pages.

36. The server system of claim 33, wherein the one or more processors are further configured to:
receive a request from a client to access the website; and
communicate a portion of the web service performance index based on at least one client characteristic and at least partially in response to the request.

37. The server system of claim 25, wherein each service client is associated with a Web Services Distributed Management (WSDM) interface.

38. A system for providing at least one web service performance index for a plurality of web services, the system comprising:
one or more processors configured to:
register a plurality of remote web services;
for each of the registered remote web services, load a separate service client associated with the given registered remote web service, wherein each service client includes one or more observer modules, and wherein each observer module is configured to collect service metric data from a single corresponding performance metric of a web service;

selecting a first registered remote web service of the plurality of registered remote web services using a first loaded service client that is associated with the first registered remote web service;

collect, using the one or more observer modules of the first loaded service client, first service metric data from the first registered remote web service, the first service metric data comprising one or more individual performance metrics for the first registered remote web service;

parse the collected first service metric data to generate at least one first performance index using the first service metric data, wherein the at least one first performance index indicates a performance of the first registered remote web service;

selecting a second registered remote web service of the plurality of registered remote web services using a second loaded service client that is associated with the second registered remote web service;

collect, using the one or more observer modules of the second loaded service client, second service metric data from the second registered remote web service, the second service metric data comprising one or more individual performance metrics for the second registered remote web service; and parse the collected second service metric data to generate at least one second performance index using the second service metric data, wherein the at least one second performance index indicates a performance of the second registered remote web service.

39. The server system of claim 38, wherein the one or more processors are further configured to:

generate a home web page based at least in part on the loaded service clients;

generate a first web service page for the first registered remote web service;

embed the at least one first performance index in the first web service page, wherein the home web page is linked to the first web service page;

generate a second web service page for the second registered remote web service; and embed the at least one second performance index in the second web service page, wherein the home web page is linked to the second web service page.

40. A system for providing at least one web service performance index for a plurality of web services, the system comprising:

at least one memory unit in a server with instructions stored thereupon;

one or more processors in the server coupled to the memory unit, the one or more processors when executing the instructions cause the server to:

register a plurality of remote web services;

for each of the registered remote web services, load a separate service client associated with the given registered remote web service, wherein each service client includes one or more observer modules, and wherein each observer module is configured to collect service metric data from a single corresponding performance metric of a web service;

schedule a collection of service metric data using the one or more observer modules of a corresponding service client from the loaded service clients;

process at the server the collected service metric data;

determine when a predetermined amount of service metric data has been collected by the server; and when the predetermined amount of service metric data has been collected:

parse the collected service metric data into individual performance metrics;

merge the collected service metric data for each individual performance metric into one or more performance metric groups;

compare each performance metric within the one or more performance metric groups with another performance metric in the one or more performance metric groups; and generate a ranked graphical representation for each performance metric group based upon the comparison for publishing to a website.

* * * * *

UNITED STATES PATENT AND TRADEMARK OFFICE
CERTIFICATE OF CORRECTION

PATENT NO.        : 8,560,504 B2
APPLICATION NO.   : 10/995654
DATED             : October 15, 2013
INVENTOR(S)       : Leo F. Parker et al.

Page 1 of 1

It is certified that error appears in the above-identified patent and that said Letters Patent is hereby corrected as shown below:

In the Claims

Column 13, line 17 (claim 24, line 5) please change "a : portion" to -- a portion --

Signed and Sealed this
Twenty-fourth Day of June, 2014

Michelle K. Lee
*Deputy Director of the United States Patent and Trademark Office*